Jan. 25, 1949.　　　　T. R. WEBER　　　　2,459,905
JOURNAL BOX LID STRUCTURE
Filed Dec. 4, 1945　　　　　　　　　　　3 Sheets-Sheet 2
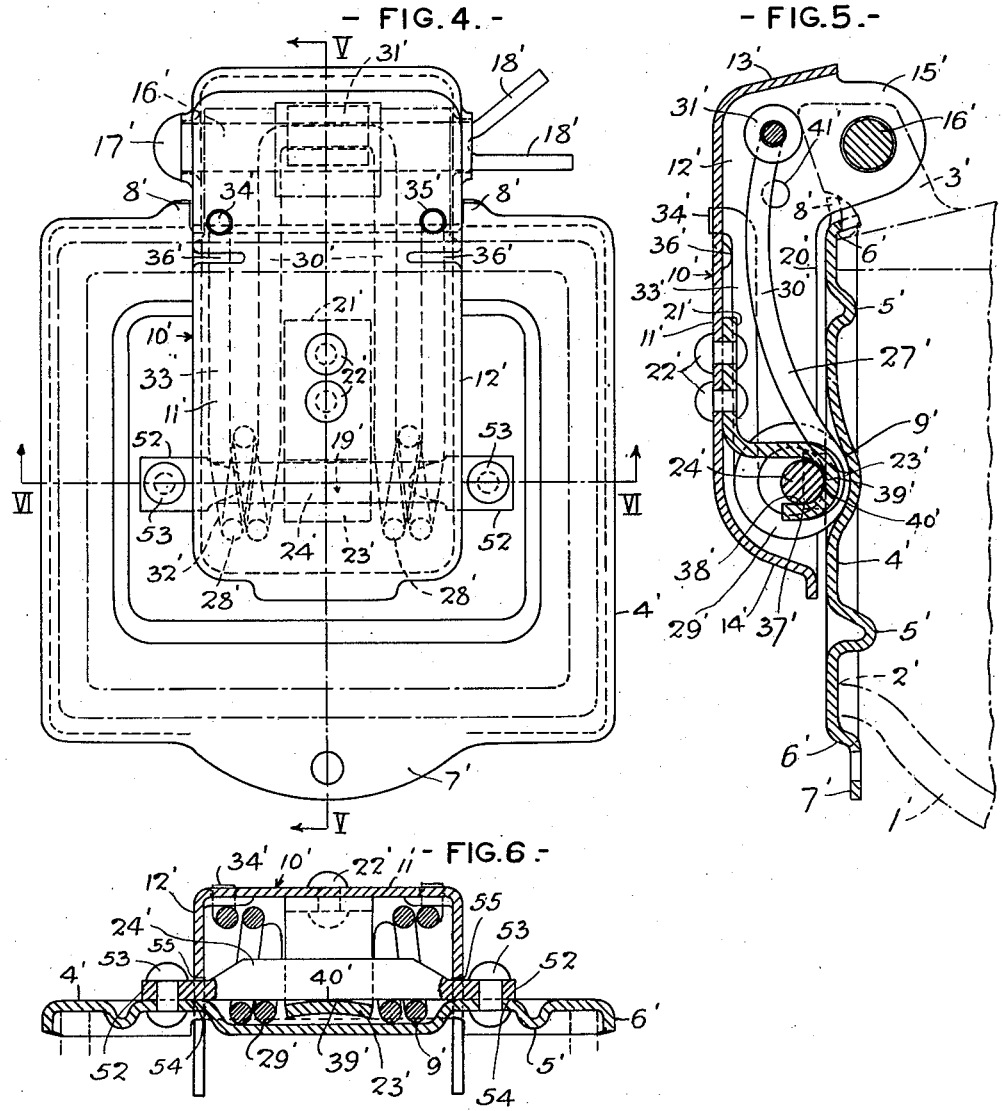
INVENTOR
Theodore R. Weber
BY S. C. Yeaton
ATTORNEY Jan. 25, 1949.   T. R. WEBER   2,459,905
JOURNAL BOX LID STRUCTURE
Filed Dec. 4, 1945   3 Sheets-Sheet 3
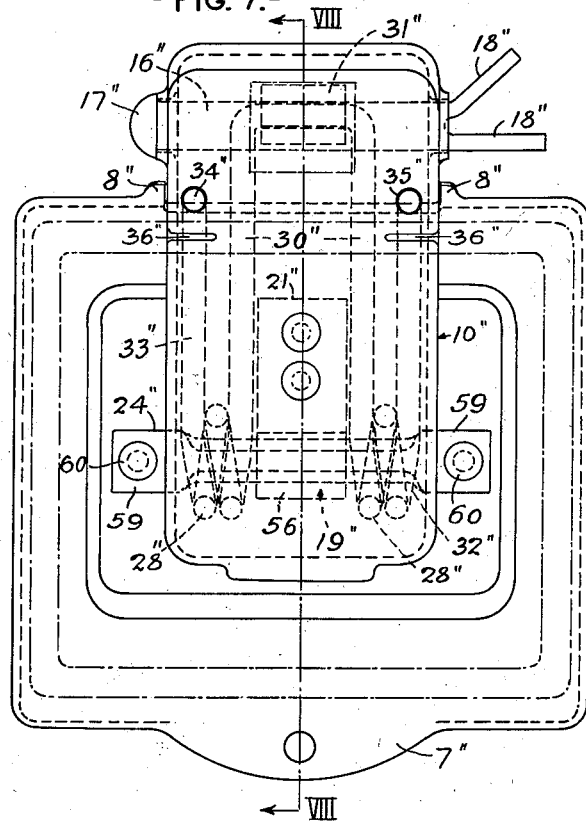
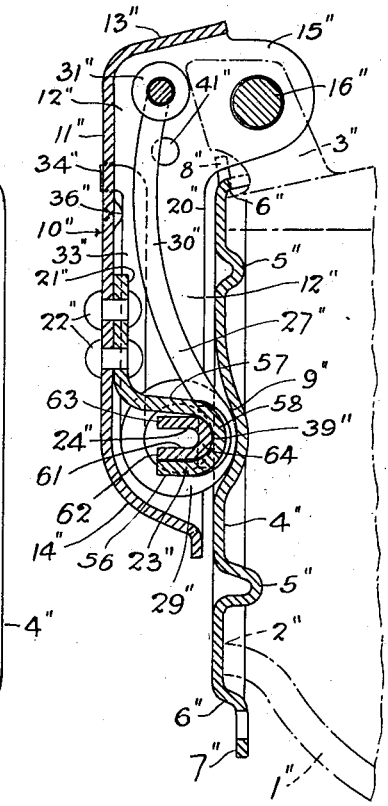
INVENTOR
Theodore R. Weber
BY S. C. Yeaton
ATTORNEY Patented Jan. 25, 1949

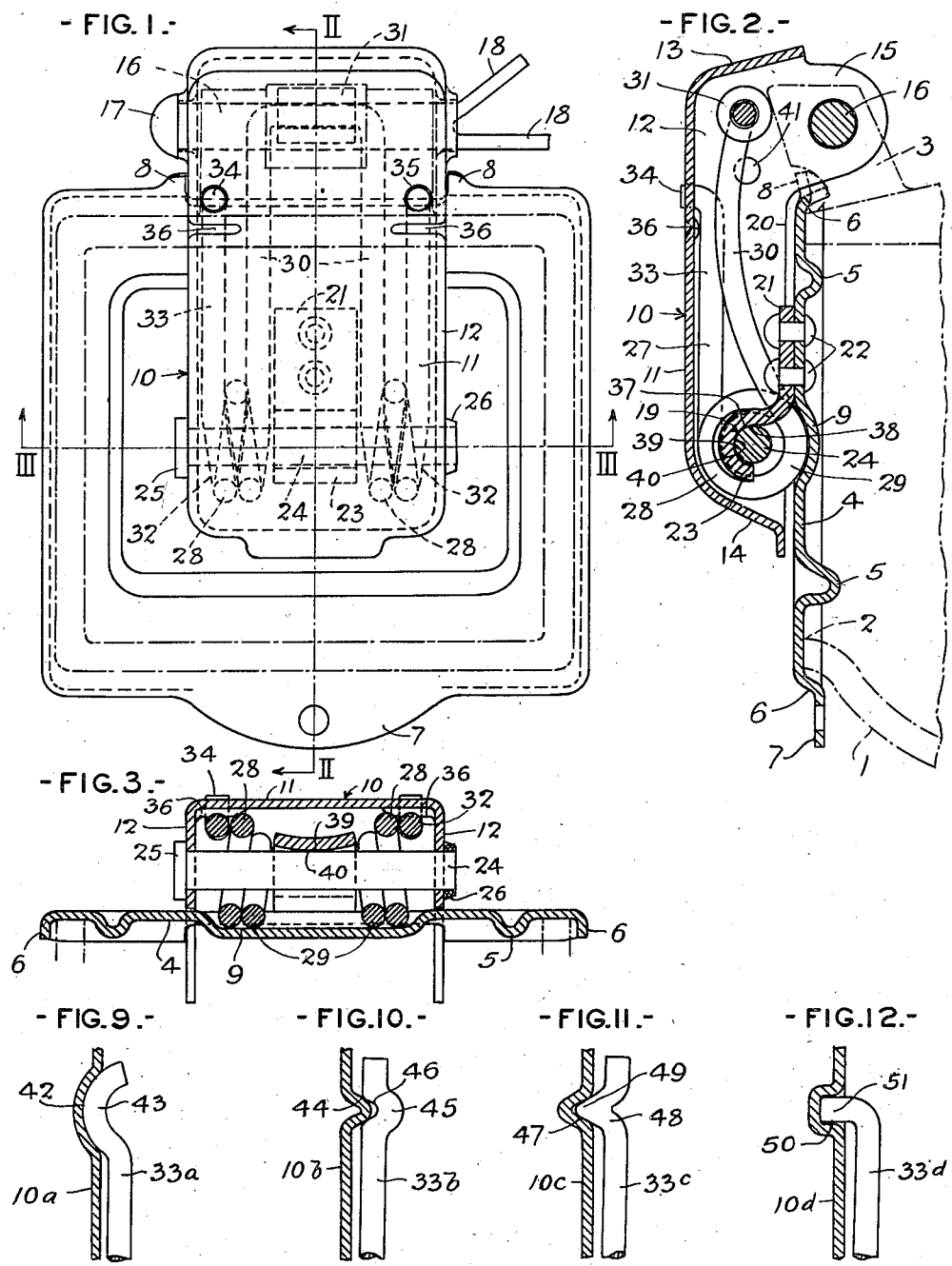

2,459,905

UNITED STATES PATENT OFFICE 2,459,905

JOURNAL BOX LID STRUCTURE

Theodore R. Weber, Latrobe, Pa., assignor to American Locomotive Company, New York, N. Y., a corporation of New York Application December 4, 1945, Serial No. 632,619

10 Claims. (Cl. 308—47)

This invention relates to journal box lid structures.

An object of the invention is to provide a journal box structure of the open face type having a lid construction employing a hairpin type torsion spring having two coiled portions bearing on the lid, a yoke extending upwardly from the coiled portions bearing on the cam lug of the box and arms extending upwardly from the coiled portions bearing on the hood or carrier between the coiled portions and the lug.

A further object is to provide a journal box structure as aforesaid wherein the bearing of the spring arms on the carrier is in the nature of a fulcrum leaving the spring free to assume the desired position for its engagement with the lid, lug and carrier.

A further object is to provide a journal box structure as aforesaid wherein a sturdy articulated joint is provided for firmly connecting the lid to the carrier while permitting a tilting movement of the lid about transverse and longitudinal axes relative to the carrier.

Other and further objects of the invention will appear from the following description, the accompanying drawings and the appended claims.

Referring to the drawings forming a part of this application, Figure 1 is a front elevation of a journal box structure embodying the present invention, the journal box being indicated in dot and dash lines; Fig. 2 is a section on the line II—II of Fig. 1, parts being shown in full and the journal box being shown fragmentally in dot and dash lines; Fig. 3 is a section on the line III—III of Fig. 1, parts being shown in full and the journal box being shown fragmentally in dot and dash lines; Fig. 4 is a view similar to that of Fig. 1 showing another embodiment of the invention; Fig. 5 is a view, similar to that of Fig. 2, taken on the line V—V of Fig. 4; Fig. 6 is a view, similar to that of Fig. 8, taken on the line VI—VI of Fig. 4; Fig. 7 is a view, similar to that of Fig. 1, showing another embodiment of the invention; Fig. 8 is a view, similar to that of Fig. 2, taken on the line VIII—VIII of Fig. 7; and Figs. 9, 10, 11 and 12 are fragmentary views showing a portion of the carrier in section and a portion of one of the spring arms illustrating four different ways of fulcruming the spring arm to the carrier.

Referring to Figs. 1 to 3, the journal box 1 has an open face 2 and an orificed cam lug 3 above the open face. A lid 4 closes the open face 2 and is of the usual eyeless type having a four-sided rearwardly extending rib 5, a peripheral rearwardly extending flange 6 overlapping the walls of the box when the lid is closed, a depending orificed tongue 7 to facilitate opening and closing the lid and spaced upwardly extending lips 8. The lid preferably, but not necessarily, is provided with a rearwardly extending recess 9 for a purpose later to appear.

A hood or carrier 10 supports the lid. It has a front wall 11, side walls 12, a top wall 13 and a bottom wall 14. The side walls 12 have upper rearwardly extending orificed ears 15, the orifices of which are in line with the orifice of the lug 3. A hinge pin 16 extends through the ear and lug orifices thereby pivotally mounting the carrier upon the lug. The pin may be of any suitable type. It is shown as having a head 17 at one end and its opposite end is split, providing branches 18, one of which bent to retain the pin in place.

The lid is connected to the carrier by an articulated joint 19. The lips 8 are disposed one adjacent each of the side walls 12 serving to prevent any tendency of the lid to turn in its plane relative to the carrier. The side walls 12 at their rear edges 20 opposite the lid are somewhat spaced therefrom leaving the lid free to firmly seat upon the edges of the walls of the box adjacent the open face 2. The space allows a free limited tilting movement of the lid relative to the carrier when the lid is raised and lowered to respectively open and close the box, this movement being checked by the edges 20 engaging the lid.

A plate 21 is secured at its upper end by rivets 22 to the lid 4 at its transverse central portion. The lower end of the plate is shaped to form a forwardly extending loop 23 which provides part of the articulated joint 19. The loop may be closed but it is preferably, as shown, open at the side adjacent the lid 4. A transverse bar 24 forms the other part of the articulated joint 19. The bar 24 has a center portion circular in cross section and the loop 23 is mounted on this portion of the bar. The bar 24 is mounted in orifices in the side walls 12. The bar is provided at one end with a head 25 and is secured at its other end to the adjacent side wall 12 by weld metal 26.

A hairpin type torsion spring 27 is housed in the carrier. It is formed of two spaced coiled portions 28, one adjacent each side wall 12. The loop 23 is preferably of sufficient width to just fit within the space between the coiled portions. The coiled portions encircle the bar 24 at each side of the loop 23 and seat at their inner portions upon the lid 4 at the longitudinal center portion thereof.

The spring is made of one piece of wire of suitable gauge to render the required force and the coils of the coiled portions are large in diameter to aid in providing the required flexibility to insure the lid firmly seating upon the box.

The spring at the rear portion of the inner coil 29 of each coiled portion (i. e. its portion adjacent the lid 4), extends upwardly to form a yoke 30, the upper end of which has a roller 31 mounted thereon which engages the cam face of cam lug 3. The spring at the forward portion of the outer coil 32 of each coiled portion (i. e. its portion adjacent the wall 11), extends upwardly to form an arm 33.

The arms 33 have outwardly bent upper ends 34 and the wall 11 has orifices 35 through which the bent ends 34 extend. Beneath the orifices 35 the wall 11 is depressed rearwardly opposite each arm 33. These depressions are disposed between the coiled portions 28 and the roller 31 and engage the arms 33 providing thereby fulcrums 36 for the spring. The energized torsion spring produces simultaneous spring pressures upon the lid, upon the cam lug, and upon the fulcrums. The fulcrums facilitate the spring assuming these spring-pressed engagements.

The lid is free to tilt about transverse and longitudinal axes relative to the carrier to compensate for any slight irregularities that might be present in the fit of the carrier with the box and lid. This insures the lid evenly seating upon the box.

The spring bent ends 34 engage the lower portions of the orifices 35. Thus the spring is supported by the carrier. The coiled portions of the spring engage the central portion of the lid to provide the desirable location of the pressure upon the lid, and consequently the articulated joint 19 will be disposed substantially opposite the central portion of the lid.

Where the recess 9 is employed this will likewise be at the central portion of the lid, and the coiled portions of the springs will seat in the recess. The recess to this end is arcuate in cross section and of a radius substantially equal to the outer radius of the spring coils. The recess 9 does not lessen the ability of the lid to tilt as aforesaid. It has the advantage of providing more room between the lid and carrier so that a larger spring coil may be employed. It also affords added support for the spring and may be in some cases relied upon for total support of the spring where it is desired to eliminate the bent ends 34 although it is preferable that these bent ends be employed as they definitely position the arms 33. While a single recess 9 has been employed, it will be understood that two may be employed, one for each of the coiled portions.

The lid is supported by the carrier through the upper portion 37 of the inner face of the loop 23 engaging the corresponding upper portion 38 of the bar 24, and this engagement should be along the entire width of the loop 23 and over as broad an area as is feasible to minimize the wear between these engaging faces which provide for the tilting of the lid about a transverse axis, this axis being the axis of the bar 24.

The spring produces a force tending to spread the lid and carrier apart and this is resisted by the engagement of the portion 39 of the inner face of the loop with the corresponding side portion 40 of the bar which is opposite to but remote from the lid 4. These engaging faces provide for the tilting of the lid about a longitudinal central vertical axis. This engagement should preferably be substantially line contact. To this end the portion 39 of the loop is curved as shown in Fig. 3 providing line contact with the portion 40.

The side walls 12 have aligned orifices 41 and the yoke 30 is curved somewhat forwardly to partly intercept the path between the orifices. When the yoke is forced forwardly to escape this path a pin (not shown) may be inserted in the orifices to hold the roller in this position. This is a usual expediency followed in assembling the lid construction with the box or removing it therefrom. After assembly of the lid construction with the box is accomplished, the pin is withdrawn.

There are various means of providing the fulcrum for the spring, and by the same means supporting or anchoring the spring from the carrier. Figs. 9 to 12 show four different constructions for accomplishing this. While in each instance only one construction is shown it will be understood that similar constructions are employed for each arm of the spring. Furthermore in each instance only a portion of an arm and a portion of the front wall of the carrier are shown.

In Fig. 9 the carrier 10a is provided at its front wall with a forwardly curved vertical socket 42 for the arm 33a. The arm 33a has an upper end 43, curved forwardly similar to the socket 42, which seats in the socket 42.

In Fig. 10 the carrier 10b at its front wall is provided with a rearwardly extending projection 44 having upper and lower rearwardly converging faces for the arm 33b. The arm 33b has an upper end 45 formed to provide a groove 46 shaped similarly to the projection 44 which fits over the projection.

In Fig. 11 the carrier 10c at its front wall is provided with a forwardly projecting socket 47 having upper and lower forwardly converging faces for the arm 33c. The arm 33c has an upper end 48 formed to provide a projection 49 shaped similarly to the socket 47 which fits in the socket.

In Fig. 12 the carrier 10d at its front wall has a forwardly projecting socket 50 circular in cross section for the arm 33d. The arm 33d has an upper end 51 bent forwardly which fits in its socket.

The joint between the carrier and spring arm in each of the four instances provides a fulcrum. The joints of the two arms with their carrier in each instance serve to support or anchor the spring. The spring arm is spring-pressed against the carrier at the joint therebetween. The joint is preferably disposed at a location on the carrier front wall similar to the location of the fulcrum 36 on the carrier 10 of Fig. 2, namely at a location between the coiled portions of the spring and the cam lug of the box.

Figs. 4 to 6 show an embodiment of the invention quite similar to that of Figs. 1 to 3 and like parts will be indicated by like reference numerals with an accent added. No detailed description is therefore considered necessary and only the points of difference will be pointed out.

The plate 21' is riveted to the front wall 11' of the carrier 10' by rivets 22', the loop 23' thereby extending rearwardly. The bar 24' has flat ends 52 and these are secured to the lid 4' by rivets 53. Thus the loop 23' supports the lid 4'.

The loop 23' and bar 24' have portions similar to, and for the same purpose as, the portions 37 and 38 of the loop and bar respectively of Fig. 2, but these portions are at the bottom of the loop and bar and are indicated respectively by the reference numerals 37' and 38'.

Likewise the loop 23' and bar 24' have portions similar to, and for the same purpose as, the portions 39 and 40 of the loop and bar respectively of Fig. 2 but these portions are at the opposite side of the bar, i. e., the side adjacent the lid 4', and are indicated respectively by the reference numerals 39' and 40'.

The lid 4' is shown as having the recess 9', and where this recess is employed the flat ends of the bar 24' are preferably formed with their rear faces 54 flush with the rear face of the bar 24' thereby providing a space between the bar and recess into which the loop 23' extends, as shown in Fig. 6. The flat ends 52 are preferably rectangular in cross section and the walls 12' are cut out to provide slots 55 fitting these flat ends but with enough clearance to permit the required tilting of the lid 4'.

Figs. 7 and 8 show an embodiment of the invention quite similar to that of Figs. 4 to 6, and like parts will be indicated by like reference numerals with two accents added. No detailed description is therefore considered necessary and only the points of difference will be pointed out.

The loop 23'' is more U-shaped than the loops of the other two embodiments, having a bottom leg 56, a top leg 57, and a curved bend 58. The bar 24'' is formed from a flat strip of metal having flat ends 59 secured to the lid 4'' by rivets 60. The bar between the flat ends is bent to form a U-portion 61 open forwardly and has a bottom leg 62, a top leg 63, and a curved bend 64.

The curved bend 58 has a curved portion 39'' similar to, and for the same purpose as, the curved portion 39' of the embodiment of Figs. 4 to 6. The curved bend 64 seats on this portion 39'' to provide similar line contact to permit tilting or angling of the lid 4'' about a longitudinal central axis relative to the carrier 10''.

The leg 62 seats upon the leg 56 over a broad area providing ample support for the lid 4'' by the carrier 10'' and minimizing the wear between the engaging faces of the legs 56 and 62. The legs 57 and 63 diverge somewhat forwardly to provide sufficient clearance necessary to allow for the desired tilting of the lid 4'' about a transverse central axis relative to the carrier 10''.

While in the embodiment shown in Figs. 7 and 8 the plate 21'' is riveted to the carrier 10'' and the bar 24'' is riveted to the lid 4'' they may be reversed and, similar to Figs. 1 to 3, the plate 21'' may be riveted to the lid 4'' and the bar 24'' may be riveted to the carrier 10''. In such a construction, as is obvious, the loop 23'' and the bar 24'' will be reversed in direction. The bar will then support the lid 4'' and the U-portion 61 must be sufficiently spaced from the wall 11'' to provide room for the loop 23''. Furthermore the leg 63 will supportingly engage the leg 57 and the legs 56 and 62 will be spaced similar to the space between the legs 63 and 57 of Fig. 8.

While there have been hereinbefore described approved embodiment of this invention, it will be understood that many and various changes and modifications in form, arrangement of parts and details of construction may be made thereto without departing from the spirit of the invention, and that all such changes and modifications as fall within the scope of the appended claims are contemplated as a part of this invention.

The invention claimed and desired to be secured by Letters Patent is:

1. A journal box structure comprising a journal box having an open face, a cam lug above said face and a pin extending transversely through said lug; a lid closing said face; a carrier having eyes mounted on said pin; an articulated joint connecting said lid to said carrier; and a longitudinally extending hairpin type torsion spring between said lid and carrier including two coiled portions in spring-pressed engagement with said lid at its center portion for holding said lid closed, a yoke extending upwardly from said coiled portions in spring-pressed engagement at its upper end with said lug and an arm extending upwardly from each of said coiled portions, each in spring-pressed engagement at its upper end portion with said carrier between said yoke upper end and said coiled portions.

2. A journal box structure comprising a journal box having an open face, a cam lug above said face and a pin extending transversely through said lug; a lid closing said face; a carrier having eyes mounted on said pin; an articulated joint connecting said lid to said carrier; and a longitudinally extending hairpin type torsion spring between said lid and carrier including two coiled portions in spring-pressed engagement with said lid at its center portion for holding said lid closed, a yoke extending upwardly from said coiled portions in spring-pressed engagement at its upper end with said lug and an arm extending upwardly from each of said coiled portions, each of said arms at its upper portion and said carrier having interfitting parts between said yoke upper end and said coiled portions providing a fulcrum for said spring, each of said arms being in spring-pressed engagement at said fulcrum with said carrier.

3. A journal box structure comprising a journal box having an open face, a cam lug above said face and a pin extending transversely through said lug; a lid closing said face; a carrier having eyes mounted on said pin; an articulated joint including a transverse bar-like member and a loop-like member mounted on said bar-like member, one of said members being secured to said lid and the other of said members being secured to said carrier; and a longitudinally extending hairpin type torsion spring between said lid and carrier including two coiled portions in spring-pressed engagement with said lid at its center portion for holding said lid closed, a yoke extending upwardly from said coiled portions in spring-pressed engagement at its upper end with said lug and an arm extending upwardly from each of said coiled portions, each in spring-pressed engagement at its upper end portion with said carrier between said yoke upper end and said coiled portions.

4. A journal box structure comprising a journal box having an open face, a cam lug above said face and a pin extending transversely through said lug; a lid closing said face; a carrier having eyes mounted on said pin; an articulated joint including a transverse bar-like member and a loop-like member mounted on said bar-like member for relative rotative movement between said members about a transverse axis, one of said members being secured to said carrier and engaging at a substantial area of a face thereof a corresponding area of an adjcent face of the other of said members for support of said other member and to permit said rotative movement with minimum wear of said members, said supported member being secured to said lid to support same and to permit said lid to tilt relative to said carrier about said transverse axis; and a longitudinally extending hairpin type torsion spring between said lid and carrier including two coiled portions in spring-pressed engagement with said lid at its center portion for holding said lid closed, a yoke extending upwardly from said coiled portions in spring-pressed engagement at its upper end with said lug and an arm extending upwardly from each of said coiled portions, each in spring-pressed engagement at its upper end portion with said carrier between said yoke upper end and said coiled portions.

5. A journal box structure comprising a journal box having an open face, a cam lug above said face and a pin extending transversely through said lug; a lid closing said face; a carrier having eyes mounted on said pin; an articulated joint including a transverse bar-like member and a loop-like member mounted on said bar-like member, one of said members being secured to said carrier and the other of said members being secured to said lid, adjacent faces of said members oppositely disposed to said lid being in substantial line contact in a vertical central plane permitting said lid to tilt relative to said carrier about a longitudinal central axis; and a longitudinally extending hairpin type torsion spring between said lid and carrier including two coiled portions in spring-pressed engagement with said lid at its center portion for holding said lid closed, a yoke extending upwardly from said coiled portions in spring-pressed engagement at its upper end with said lug and an arm extending upwardly from each of said coiled portions, each in spring-pressed engagement at its upper end portion with said carrier between said yoke upper end and said coiled portions.

6. A journal box structure comprising a journal box having an open face, a cam lug above said face and a pin extending transversely through said lug; a lid closing said face; a carrier having eyes mounted on said pin; an articulated joint including a transverse bar-like member and a loop-like member mounted on said bar-like member for relative rotative movement between said members about a transverse axis, one of said members being secured to said carrier and engaging at a face thereof an adjacent face of the other of said members for support of said other member, said supported member being secured to said lid to support same and to permit said lid to tilt relative to said carrier about said transverse axis, said members further having adjacent faces oppositely disposed to said lid having substantially line contact in a vertical central plane permitting said lid to tilt relative to said carrier about a longitudinal central axis; and a longitudinally extending hairpin type torsion spring between said lid and carrier including two coiled portions in spring-pressed engagement with said lid at its center portion for holding said lid closed, a yoke extending upwardly from said coiled portions in spring-pressed engagement at its upper end with said lug and an arm extending upwardly from each of said coiled portions, each in spring-pressed engagement at its upper end portion with said carrier between said yoke upper end and said coiled portions.

7. A journal box structure comprising a journal box having an open face, a cam lug above said face and a pin extending transversely through said lug; a lid closing said face; a carrier having eyes mounted on said pin; an articulated joint connecting said lid to said carrier, including a transverse bar secured to said carrier having a portion circular in cross section and a loop-like member secured to said lid and engaging said bar portion; and a longitudinally extending hairpin type torsion spring between said lid and carrier including two coiled portions in spring-pressed engagement with said lid at its center portion for holding said lid closed, a yoke extending upwardly from said coiled portions in spring-pressed engagement at its upper end with said lug and an arm extending upwardly from each of said coiled portions, each in spring-pressed engagement at its upper end portion with said carrier between said yoke upper end and said coiled portions.

8. A journal box structure comprising a journal box having an open face, a cam lug above said face and a pin extending transversely through said lug; a lid closing said face; a carrier having eyes mounted on said pin; an articulated joint connecting said lid to said carrier, including a transverse bar secured to said lid having a portion circular in cross section and a loop-like member secured to said carrier and engaging said bar portion; and a longitudinally extending hairpin type torsion spring between said lid and carrier including two coiled portions in spring-pressed engagement with said lid at its center portion for holding said lid closed, a yoke extending upwardly from said coiled portions in spring-pressed engagement at its upper end with said lug and an arm extending upwardly from each of said coiled portions, each in spring-pressed engagement at its upper end portion with said carrier between said yoke upper end and said coiled portions.

9. A journal box structure comprising a journal box having an open face, a cam above said face, and a pin extending transversely through said lug; a lid closing said face; a carrier having eyes mounted on said pin; an articulated joint connecting said lid to said carrier, including a transverse bar secured to said lid having a portion U-shaped in cross section and a loop-like member secured to said carrier and engaging said bar portion; and a longitudinally extending hairpin type torsion spring between said lid and carrier including two coiled portions in spring-pressed engagement with said lid at its center portion for holding said lid closed, a yoke extending upwardly from said coiled portions in spring-pressed engagement at its upper end with said lug and an arm extending upwardly from each of said coiled portions, each in spring-pressed engagement at its upper end portion with said carrier between said yoke upper end and said coiled portions.

10. A lid structure for a journal box having an open face, a hinge cam lug above said face and a hinge pin extending transversely through said lug, comprising a lid for said face; a carrier having eyes for pivotally mounting said structure on said pin; means providing a flexible joint connecting said lid to said carrier; and a longitudinally extending hairpin type torsion spring between said lid and carrier including two coiled portions engaging said lid at its center portion, a yoke extending upwardly from said coiled portions for yieldingly pressing at its upper end against the cam of said lug, and an arm extending upwardly from each of said coiled portions, each of said arms, at its upper end portion, being in engagement with said carrier between said yoke and said coiled portions, said arms yieldingly pressing against said carrier and said coiled portions yieldingly pressing against said lid to hold said lid closed upon said box when said yoke presses upon said cam.

THEODORE R. WEBER.

REFERENCES CITED

The following references are of record in the file of this patent:

UNITED STATES PATENTS

| Number | Name | Date |
|---|---|---|
| 597,800 | Davis | Jan. 25, 1898 |
| 1,801,462 | Stewart | Apr. 21, 1931 |
| 2,044,040 | Woodman | June 16, 1938 |